Figure 3:
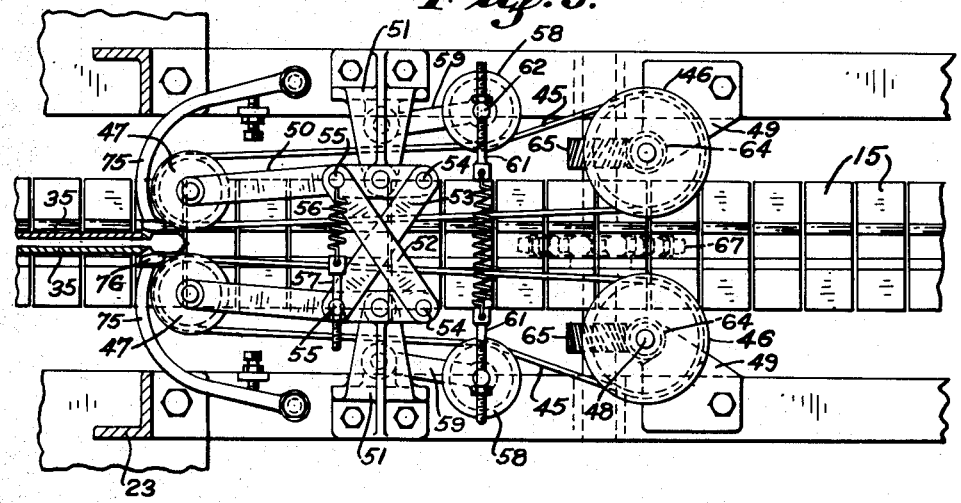

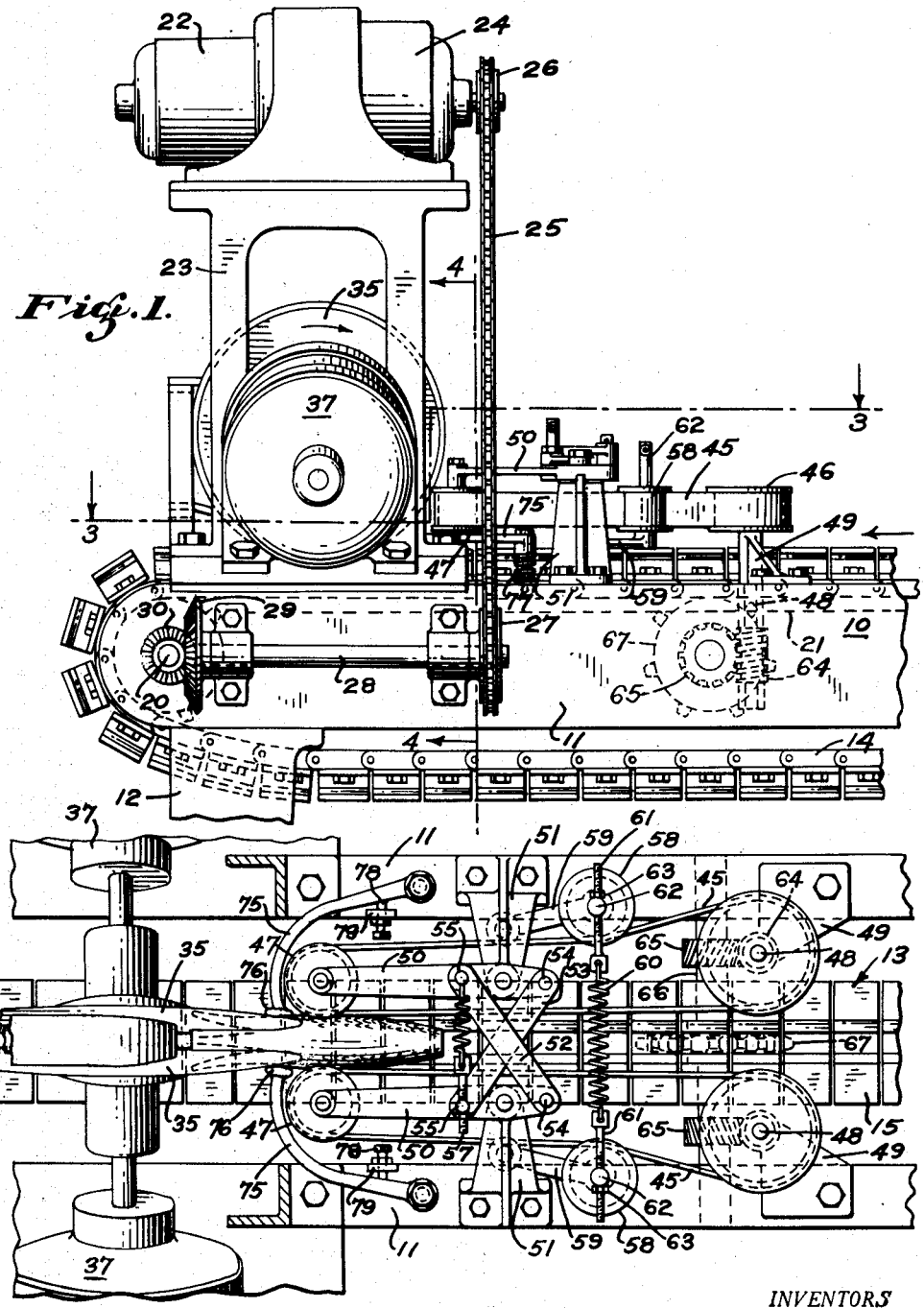

Dec. 20, 1938.  E. DAVID ET AL  2,140,575

FISH CUTTING MACHINE

Filed Sept. 5, 1936  3 Sheets-Sheet 2

INVENTORS
EDWARD DAVID
STEPHEN B. SZODY
BY
Jas. M. Naylor
ATTORNEY.

Dec. 20, 1938.  E. DAVID ET AL  2,140,575
FISH CUTTING MACHINE
Filed Sept. 5, 1936  3 Sheets-Sheet 3
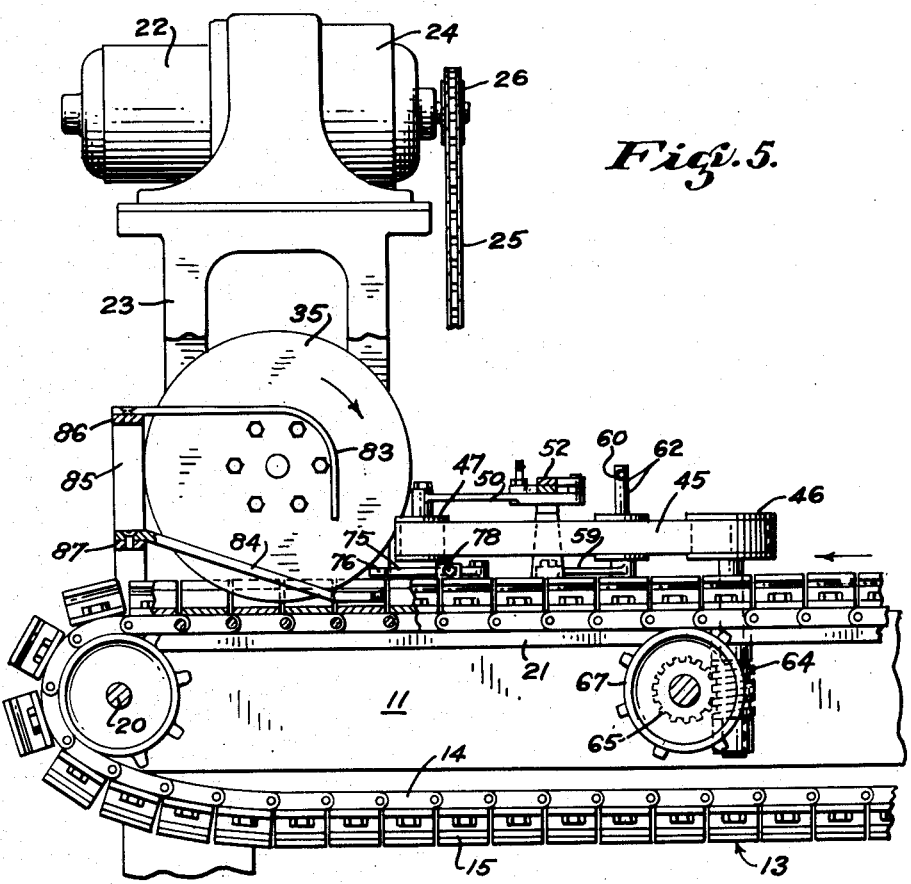
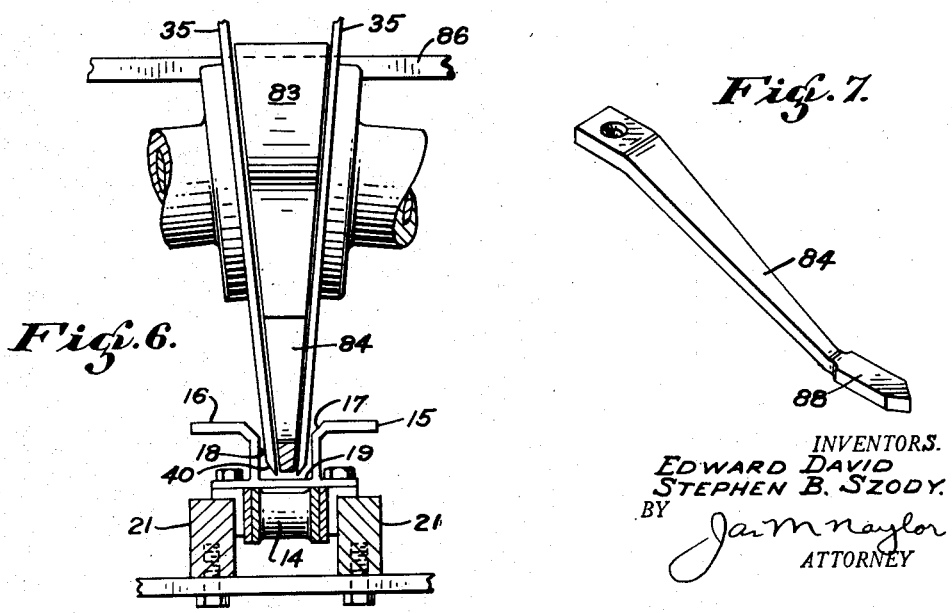
INVENTORS.
EDWARD DAVID
STEPHEN B. SZODY.
BY
Jas. M Naylor
ATTORNEY Patented Dec. 20, 1938

2,140,575

UNITED STATES PATENT OFFICE 2,140,575

FISH CUTTING MACHINE

Edward David, Carmel, and Stephen B. Szody, Seaside, Calif.

Application September 5, 1936, Serial No. 99,570

22 Claims. (Cl. 17—4)

This invention pertains to fish cutting machines and has for one of its objects the provision of means for the cutting of fillets from fish which have undergone preliminary preparation by other mechanical devices or manual process.

In particular this invention relates to a machine which is adapted to slice select and boneless cuts of meat from fish preparatory to the canning processes. In these respects it is distinguishable from those machines which cut and otherwise prepare whole fish for canning.

While in the following description reference will be made to the treatment of Monterey sardines, or pilchards, as they are sometimes termed, it will be appreciated that the invention forming the subject matter of the present application may be modified and adjusted for use with other sizes and varieties of fish without in any way departing from the spirit of the invention. It will also be appreciated that while the present machine has been developed and designed primarily for use as a part of equipment used in the preparation of fish for canning, the principle of the same may nevertheless be readily adapted for ordinary commercial use. As for example, where in the handling of fish it is desired to cut fillets rapidly and economically for sale.

The fish introduced into this machine have theretofore had their heads, tails and viscera removed manually or by other apparatus. In the case of smaller fish, such as the sardines previously mentioned, the whole cleaned and trimmed fish is conveyed into the device. On the other hand, where larger fish are to be handled, it has been found both economical and expedient to cut the fish transversely into convenient lengths.

In order that the objects of the invention may be fully understood it may be said that the fillet desired to be cut from the fish lies in that portion of the fish defined by an imaginary line drawn from the pectoral fin to the tail or caudal fin, passing slightly above the ventral and anal fins, and from thence forwardly, passing inside the second dorsal and first dorsal fins to a point above the pectoral fin. This section embraces the finest flesh of the fish and excludes the tough, gristly meat found in the belly and finny sections.

In the present machine these fillets are cut longitudinally both from lengths of the larger fish and the whole of the smaller fish.

In general the present invention comprises a pair of rotary knives pitched at an angle to each other, a conveyor passing under the knives, and a pair of endless belts disposed above the conveyor, adapted to engage the fish and align them for the cutting operation. In addition, we have provided novel guide means to work with the knives to insure the making of the desired cuts in the fish being handled.

It is an object of this invention to provide a fish cutting machine of simplified construction which works efficiently and yet has great capacity at extremely high speeds.

Other objects of the invention will become apparent as this specification proceeds and the novelty thereof will be particularly pointed out in the appended claims.

Figure 4:
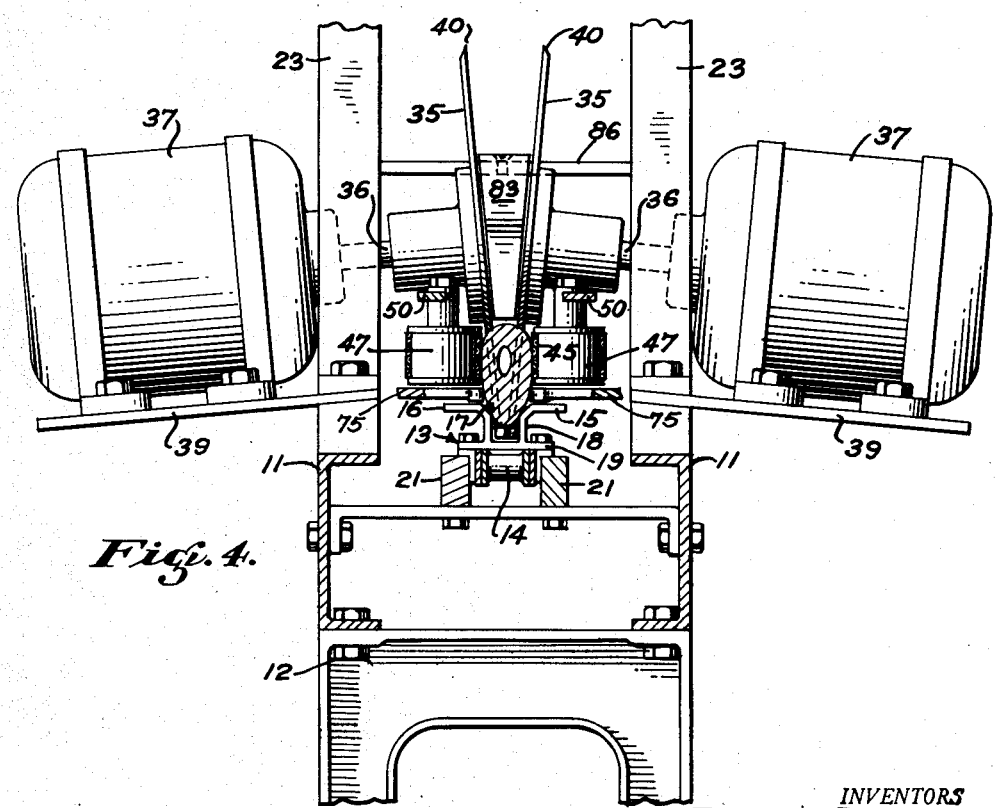

Referring now to the drawings forming a part of this application,

Figure 1 is a side elevation of a cutting machine embodying the subject matter of the invention, Figure 2 is a top plan view showing a fish during the cutting operation, Figure 3 is another top plan view with certain of the parts shown in section, the latter being taken along line 3—3 of Figure 1, Figure 4 is a sectional view along line 4—4 of Figure 1, Figure 5 is longitudinal section of the machine, particular emphasis being laid on the guide means associated with the knives, Figure 6 is an enlarged fragmentary end view of the knives, similar to Figure 4, and Figure 7 is a perspective of the lowermost guide means associated with the knives.

One of the most vexatious problems in this art has been the provision of efficient means for aligning the fish with the cutting members so that the slices are uniform and waste of the valuable meats is avoided.

It is believed that in the present invention a solution to the problem will be found embodied in a device of relatively simple construction.

A frame 10, consisting of longitudinally extending channel irons 11, and legs 12, supports the device of this invention.

The fish are moved into the cutting operation on the endless conveyor 13 which comprises a chain 14 having a series of slotted members 15 secured thereto in an end to end arrangement to form an articulated conveyor means. In Figure 4 the particular shape of the members 15 will be noted. Each has a pair of outwardly extending flat portions 16 bent downwardly at complementary 45° angles, as at 17, and then into straight walls 18 to the point of juncture with the base plate 19, by which they are connected to the links of chain 14.

In this way the fish are supported largely by being wedged in the slots formed by the angles 17 and walls 18, and the cutting means are permitted to pass through the fish and into the bottom of the slot between walls 18.

The chain 14 of conveyor 13 is engaged by a sprocket (not shown) mounted on shaft 20, journaled in channel irons 11 at the discharge end of the machine. A pair of tracks 21 support the conveyor as it moves the fish throughout the length of the machine.

Conveyor 13 is driven by a motor 22 mounted on the upper frame 23 secured to frame 10.

The transmission of this power is accomplished through the medium of a speed reducer 24 having a driving connection with shaft 28, consisting in chain 25 and sprockets 26 and 27, respectively. Bevel gear 29 on shaft 28 meshes with gear 30 on shaft 20, rotating the latter to drive conveyor 13.

Knives 35 which effect the longitudinal slicing of the fish to obtain the desired cuts are mounted directly on the shafts 36 of motors 37 (see Figure 4). Motors 37 are secured to tables 39 and the latter are attached to frame 10, the connection illustrated in Figure 4 consisting in bolted attachment to the upper edges of channel irons 11.

As will be noted in Figure 4 of the drawings knives 35 have externally beveled edges 40 and are pitched at complementary angles to each other to define a wedge, the lower arcs of the blades passing through the slots in members 15 on conveyor 13.

In order to align the fish on conveyor 13 as they approach knives 35, there is provided a pair of spaced endless guide belts 45 running directly above conveyor 13 to a point under the edge of knives 35. It is the function of these belts to engage the sides of the fish and insure that the latter are centered in slots in members 15 on conveyor 13 as fed into knives 35 by the conveyor 13.

The belts 45 are mounted on pulleys 46 and 47, the former being positioned nearest the intake end of the machine and the latter adjacent the cutting edges of knives 35. Pulleys 46 are mounted on stub shafts 48 journaled in brackets 49 attached to the upper surface of channel irons 11. Pulleys 47, on the other hand, are dependent from the ends of arms 50 pivotally mounted on the brackets 51 on channel irons 11.

As a means of constantly centering the discharge ends of guide belts 45 with respect to the conveyor 13 and knives 35, there is provided the connection between arms 50 illustrated in Figures 2 and 3 of the drawings. A pair of links 52 and 53 are crossed between and pinned to the arms 50, in each instance as at 54 and 55, on either side of the pivotal connection of arms 50 to brackets 51. A spring 56, connected at one end to one of the pins 55 and at the other to screw 57 having a threaded connection with the opposite pin 55, provides the necessary tension between the discharge ends of guide belts sufficient to firmly engage the fish as fed into knives 35. Screw 57 constitutes a simple means for controlling the pressure exerted by the belts 45 at the discharge end to accommodate fish of various sizes.

Idler pulleys 58 are mounted on stub shafts 62 affixed to the arms 59, which have dependent pivotal connection with brackets 51, to tighten guide belts 45. The interconnected tensioning means between pulleys 58 comprises a spring 60 attached at each of its ends to one of the screws 61 having threaded connection with stub shafts 62, a nut 63, in each instance locking the adjustment.

Guide belts 45 are driven in timed speed and directional relation with conveyor 13 by means of the helical gears 64 and 65, the former being keyed to shafts 48 and the latter to shaft 66 suitably journaled in channel iron 11. It is to be appreciated that any source of power will satisfactorily drive the belts 45 through the transmission means just described. Here is shown a driving connection between chain 14 and shaft 66, consisting in a sprocket 67 keyed to the latter and engaging the former to provide identity of relation in direction and speed between conveyor 13 and belts 45 (see Figs. 1 and 2).

Cooperating with the belts 45 to center the fish as they enter the knives 40, there is provided a pair of fingers 75, pivotally mounted on opposite sides of frame 10 on the upper surfaces of channel irons 11. (See Figs. 2 and 3). It will be noted that these fingers 75 are curved inwardly around pulleys 47 and terminate in the flat fish engaging ends 76. Each is provided with a coil spring 77 to urge it inwardly to the point of contact with the fish. Set screws 78, extending through upright members 79 secured to channel irons 11, act as stops to define the inward movement of the fingers and provide the necessary adjustment in this respect.

As will be noted from Figures 2 and 3 of the drawings, it is the function of the fingers 75 to contact the fish and center them as they pass from belts 45 to knives 35. In this manner a more careful feed of the fish is assured, a desirable factor considering the stated purpose of this machine.

In cutting fish, particularly at high speeds, it is deemed essential to provide means to obtain a shearing of the flesh rather a pressure cut and thus avoid injury to the flesh as well as spoiling the appearance of the final product. For example: When the fish are placed in the upper or wider portion of the slots in members 15 and moved into knives 35, the latter, rotating in a clockwise direction (looking at Figs. 1 and 5), or opposite to that of the feed of conveyor 13, there is a definite tendency of the knives to drive the fish downwardly into the lower and narrower portion of the slots in members 15. In so doing the fish would be mashed, cut unevenly and the long section would become wedged in the slot and difficult to remove.

To meet this tendency, upper guide 83 and lower guide 84 are placed between the knives 35 (see Figs. 3, 4 and 5). Both of these guides are mounted on the frame member 85, guide 83 being attached to the cross bar 86 and lower guide 84 being secured to cross bar 87.

By referring to Figures 5 and 6 it will be seen that guide member 84 extends downwardly toward the forward or cutting edge of knives 35, tapering to meet the pitch of the knives at substantially the juncture of the upper and lower slots in members 15. From this point a toe 88 is bent outwardly on a horizontal plane to ride in lower portion of the slot in the members 15, slightly clear of bottom.

The toe 88 of guide members 84 slides under the oncoming fish to insure movement of the medial or bony portion thereof up the incline of guide 84, as well as to prevent the fish becoming wedged in the slot in members 15. Due to the nearly infinitesimal clearance between guide 84 and knives 35, and the angle of the latter, a shearing action is produced on the fish by the coaction of these elements, making a clean cut of both the skin and flesh.

As the cutting is completed, the backbone section of the fish travels up the incline of guide member 84, between knives 35 to be discharged in any convenient manner for disposal. The fillets, on the other hand, fall to either side of the knives 35 onto the flat sections of members 15, to be subsequently discharged from the conveyor for delivery to processing equipment. Upper guide 83, also tapered to compensate for the pitch of knives 40, is adapted to prevent the backbone sections of the fish from being thrown about by the centrifugal force of the knives and the free end thereof, being bent downwardly in a vertical plane directly above the shearing area formed by knives 40 and guide 84, prevents fish from being raised from the latter during the cutting operation.

In operation the fish, either whole or cut into convenient lengths, are fed onto conveyor 13. As they progress they come between belts 45 for alignment both as to position on conveyor 13 and as to knives 35. The distance between the ends of belts 45, as they pass over pulleys 47, is sufficient to pass fish of a predetermined size and yet when a slightly off-sized fish is encountered, the spring 56 will allow immediate adjustment of the belts to avoid congestion or damage to the fish.

As the fish pass from belts 45 they are contacted by fingers 75 and introduced into knives 35 in proper alignment. The bony or medial section of the fish slides over toe 88 on guide 84, and the fish moves into the cutting operation. The fillets are separated from the undesirable bony section by the combined action of knives 35 and guide 84 and fall on the flat sections of members 15. The remainder of the fish passes between knives 35 over the incline of guide 84.

While the respective discharging of the desired and undesired portions of the fish from the machine forms no part of this invention, other than as stated, it is appreciated that many conventional means are available. For example, the common practice is to provide separate chutes leading to flumes adapted to carry the discharge to other processing equipment and the reduction plant, respectively.

It will be appreciated that although only one form of the invention has been here illustrated and described, the principle is subject to many changes and modifications, and therefore there is no desire to limit the scope of the invention to that form specified herein, but only to the extent of the prior art and the spirit of the appended claims.

The following is claimed:

1. In a fish cutting machine, rotary knives for cutting the fish longitudinally, a conveyor passing under said rotary knives, said conveyor having a longitudinally extending slot to accommodate the cutting edge of said knives, and a pair of spaced endless belts disposed above said conveyor but terminating short of the edges of said knives, for aligning the fish on said conveyor.

2. In a fish cutting machine, means for cutting the fish longitudinally, means for conveying the fish through the cutting means on a horizontal plane, means superposed above said conveying means for aligning the fish on the latter with respect to said cutting means, and means cooperating with said conveying means and said cutting means for producing a shearing action during the cutting operation.

3. In a fish cutting machine, means for cutting the fish longitudinally, means for conveying the fish through the cutting means on a horizontal plane, means superposed above said conveying means for aligning the fish on the latter with respect to said cutting means, and means disposed in said cutting means and cooperating therewith to produce a shearing action during the cutting operation.

4. In a fish cutting machine, means for cutting the fish longitudinally, means for conveying the fish through the cutting means on a horizontal plane, means superposed above said conveying means for aligning the fish on the latter with respect to said cutting means, and means disposed in said cutting means and cooperating therewith and with said conveying means to insure proper introduction of the fish and to produce a shearing action during the cutting operation.

5. In a fish cutting machine, a pair of rotary knives for cutting the fish longitudinally, a conveyor passing under said rotary knives on a horizontal plane, said conveyer having a longitudinally extending slot to accommodate the cutting edges of said knives, guide means disposed between said knives, said guide means having an extension adapted to ride in the slot in said conveyor and coact with said knives to produce a shearing action.

6. In a fish cutting machine, a pair of rotary knives for cutting the fish longitudinally, a conveyor passing under said rotary knives on a horizontal plane, said conveyor having a longitudinally extending slot to accommodate the cutting edge of the knives, a guide between said rotary knives having an extension adapted to ride in the slot in said conveyor, said guide and the extension thereof and said knives co-acting to produce a shearing action.

7. In a fish cutting machine, a pair of rotary knives for cutting the fish longitudinally, a conveyor passing under said rotary knives on a horizontal plane, said conveyor having a longitudinally extending slot to accommodate the cutting edge of the knives, a guide between said rotary knives having an extension adapted to ride in the slot in said conveyor, said guide and the extension thereof and said knives co-acting to produce a shearing action, and alignment means superposed above said conveyor.

8. In a fish cutting machine, a pair of longitudinal cutters having a complementary pitch to define a wedge cut on a horizontal plane, conveyor means for causing fish to pass through said cutters, and means co-acting with said cutters to produce a shearing action during the cutting operation.

9. In a machine adapted to cut fillets from a fish, a pair of cutters pitched at opposite angles to define a wedge cut, means for causing the fish to pass through said cutters, and upper and lower guide means, said lower guide means co-acting with said cutters to produce a shearing action during the cutting operation, and said upper guide means co-acting with said cutters and said lower guide means to restrict vertical movement of the middle section of the fish in the cutting operation.

10. In a machine adapted to cut fillets from a fish, a pair of cutters pitched at opposite angles to define a wedge cut, means for causing the fish to pass through said cutters, alignment means cooperating therewith, and upper and lower guide means between said cutters, said lower guide means co-acting with said cutters to produce a shearing action during the cutting operation, and said upper guide means co-acting with said cutters and said lower guide means to restrict vertical movement of the middle section of the fish in the cutting operation.

11. In a machine adapted to cut fillets from a fish, the combination of a pair of rotary cutters pitched at opposite angles to define a wedge cut, endless conveyor means for causing the fish to pass through said cutters on a horizontal plane, said conveyor means having a longitudinal fish receiving groove therein and a cutter edge receiving slot below said groove, endless guide means disposed on either side of said conveyor with their discharge ends at substantially the edges of said cutters, and auxiliary fish guiding means positioned between said cutters and said endless guide means.

12. In a machine adapted to cut fillets from a fish, the combination of a pair of rotary cutters pitched at opposite angles to define a wedge cut, endless conveyor means for causing the fish to pass through said cutters on a horizontal plane, said conveyor means having a longitudinal fish receiving groove therein and a cutter edge receiving slot below said groove, endless guide means disposed on either side of said conveyor with their discharge ends at substantially the edges of said cutters, and yieldable auxiliary fish guiding means positioned between said cutters and said auxiliary guide means.

13. In a machine adapted to cut fillets from a fish, the combination of a pair of rotary cutters pitched at opposite angles to define a wedge cut, endless conveyor means for causing the fish to pass through said cutters on a horizontal plane, said conveyor means having a longitudinal fish receiving groove therein and a cutter edge receiving slot below said groove, endless guide means disposed on either side of said conveyor with their discharge ends at substantially the edges of said cutters, and a pair of fish positioning fingers having their ends disposed between said cutters and said endless guide means.

14. In a machine adapted to cut fillets from a fish, the combination of a pair of rotary cutters pitched at opposite angles to define a wedge cut, endless conveyor means for causing the fish to pass through said cutters on a horizontal plane, said conveyor means having a longitudinal fish receiving groove therein and a cutter edge receiving slot below said groove, endless guide means disposed on either side of said conveyor with their discharge ends at substantially the edges of said cutters, and a pair of yieldable fish positioning fingers having their ends disposed between said cutters and said endless guide means.

15. In a machine adapted to cut fillets from a fish, the combination of a pair of rotary cutters pitched at opposite angles to define a wedge cut, endless conveyor means for causing the fish to pass through said cutters on a horizontal plane, said conveyor means having a longitudinal fish receiving groove therein and a cutter edge receiving slot between said groove, endless guide means disposed on either side of said conveyor with their discharge ends at substantially the edges of said cutters, auxiliary fish guiding means positioned between said cutters and said endless guide means, upper and lower guide means disposed between said cutters, said lower guide means co-acting with said cutters to produce a shearing action during the cutting operation, and said upper guide means coacting with said cutters and said lower guide means to restrict vertical movement of the middle section of the fish in the cutting operation.

16. In a machine adapted to cut fillets from a fish, the combination of a pair of rotary cutters pitched at opposite angles to define a wedge cut, endless conveyor means for causing the fish to pass through said cutters on a horizontal plane, said conveyor means having a longitudinal fish receiving groove therein and a cutter edge receiving slot between said groove, endless guide means disposed on either side of said conveyor with their discharge ends at substantially the edges of said cutters, auxiliary fish guiding means positioned between said cutters and said endless guide means, and a guide member between said cutters having an extension adapted to ride in the slot in said conveyor.

17. In a machine adapted to cut fillets from a fish, the combination of a pair of rotary cutters pitched at opposite angles to define a wedge cut, endless conveyor means for causing the fish to pass through said cutters on a horizontal plane, said conveyor means having a longitudinal fish receiving groove therein and a cutter edge receiving slot between said groove, endless guide means disposed on either side of said conveyor with their discharge ends at substantially the edges of said cutters, auxiliary fish guiding means positioned between said cutters and said endless guide means, and a guide member between said cutters having an extension adapted to ride in the slot in said conveyor said guide member coacting with said cutters to produce a shearing action.

18. In a machine adapted to cut fillets from a fish, the combination of a pair of rotary cutters pitched at opposite angles to define a wedge cut, endless conveyor means for causing the fish to pass through said cutters on a horizontal plane, said conveyor means having a longitudinal fish receiving groove therein and a cutter edge receiving slot between said groove, endless guide means disposed on either side of said conveyor with their discharge ends at substantially the edges of said cutters, auxiliary fish guiding means positioned between said cutters and said endless guide means, and a guide member disposed between said cutters having a toe piece in the slot in said endless conveyor.

19. In a machine adapted to cut fillets from a fish, the combination of a pair of rotary cutters pitched at opposite angles to define a wedge cut, endless conveyor means for causing the fish to pass through said cutters on a horizontal plane, said conveyor means having a longitudinal fish receiving groove therein and a cutter edge receiving slot between said groove, endless guide means disposed on either side of said conveyor with their discharge ends at substantially the edges of said cutters, auxiliary fish guiding means positioned between said cutters and said endless guide means, and a guide member between said cutters having a toe piece riding in the slot in said endless conveyor to engage fish in the grove therein and coacting with said knives to produce a shearing action during the cutting operation.

20. In a machine adapted to cut fillets from a fish, a pair of cutters pitched at opposite angles to define a wedge cut, means for causing the fish to pass through said cutters, alignment means cooperating therewith, and a guide member between said cutters coacting with the latter to produce a shearing action during the cutting operation.

21. In a machine adapted to cut fillets from a fish, a pair of cutters pitched at opposite angles to define a wedge cut, means for causing the fish to pass through said cutters, and a guide member between said cutters coacting with the latter to produce a shearing action during the cutting operation.

22. In a machine adapted to cut fillets from a fish, a pair of cutters pitched at opposite angles to define a wedge cut, and a guide member between said cutters coacting with the latter to produce a shearing action during the cutting operation.

EDWARD DAVID.
STEPHEN B. SZODY.